(12) United States Patent
Kwak

(10) Patent No.: US 9,621,434 B2
(45) Date of Patent: *Apr. 11, 2017

(54) DISPLAY APPARATUS, REMOTE CONTROL APPARATUS, AND METHOD FOR PROVIDING USER INTERFACE USING THE SAME

(71) Applicant: SAMSUNG ELECTRONICS CO., LTD., Suwon-si (KR)

(72) Inventor: Jong-won Kwak, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/607,869

(22) Filed: Jan. 28, 2015

(65) Prior Publication Data

US 2015/0143250 A1 May 21, 2015

Related U.S. Application Data

(63) Continuation of application No. 14/105,440, filed on Dec. 13, 2013, now Pat. No. 8,953,099.

(30) Foreign Application Priority Data

Dec. 13, 2012 (KR) .................. 10-2012-0145695

(51) Int. Cl.
*H04N 5/44* (2011.01)
*H04L 12/24* (2006.01)
(Continued)

(52) U.S. Cl.
CPC .......... *H04L 41/22* (2013.01); *G06F 3/04842* (2013.01); *H04L 67/10* (2013.01);
(Continued)

(58) Field of Classification Search
USPC ....... 348/734, 725, 719, 716, 714, 636, 680, 348/693, 563, 569, 211.1, 231.3, 14.02,
(Continued)

(56) References Cited

U.S. PATENT DOCUMENTS 6,532,592 B1* 3/2003 Shintani ............... H04N 5/4403
348/734
8,564,727 B2* 10/2013 Okuda ................... G08C 17/02
348/725

(Continued)

FOREIGN PATENT DOCUMENTS

EP 2339835 A2 6/2011
EP 2495986 A1 9/2012
(Continued)

OTHER PUBLICATIONS

Search Report dated Mar. 31, 2014, issued by the International Searching Authority in counterpart International Application No. PCT/KR2013/011521.

(Continued)

*Primary Examiner* — Brian Yenke
*Assistant Examiner* — Mustafizur Rahman
(74) *Attorney, Agent, or Firm* — Sughrue Mion, PLLC

(57) ABSTRACT

A display apparatus which is controllable by a remote control apparatus is provided. The display apparatus includes: a communicator which communicates with the remote control apparatus, a storage which stores user interface (UI) screen information which is mapped to each application executable in the display apparatus, and a controller which, if a first application is executed based on a user command, controls a transmission of UI screen information corresponding to the first application from among the UI screen information stored in the storage to the remote control apparatus.

11 Claims, 11 Drawing Sheets

(51) Int. Cl.
　　*H04N 21/422*　　(2011.01)
　　*H04N 21/431*　　(2011.01)
　　*H04N 21/478*　　(2011.01)
　　*H04N 21/41*　　(2011.01)
　　*G06F 3/0484*　　(2013.01)
　　*H04L 29/08*　　(2006.01)

(52) U.S. Cl.
　　CPC ....... *H04N 5/4403* (2013.01); *H04N 21/4126* (2013.01); *H04N 21/4222* (2013.01); *H04N 21/42207* (2013.01); *H04N 21/42208* (2013.01); *H04N 21/42209* (2013.01); *H04N 21/42224* (2013.01); *H04N 21/42228* (2013.01); *H04N 21/4312* (2013.01); *H04N 21/478* (2013.01)

(58) Field of Classification Search
　　USPC .......... 348/14.03, 14.07, 14.12, 25; 345/156, 345/169; 715/700, 719, 740, 746, 762; 340/12.22, 12.23, 12.54; 725/39, 40, 43
　　See application file for complete search history.

(56) References Cited

U.S. PATENT DOCUMENTS

| | | | |
|---|---|---|---|
| 8,646,000 | B2 | 2/2014 | Kang et al. |
| 2009/0079869 | A1 | 3/2009 | Kim |
| 2011/0085083 | A1* | 4/2011 | Friedlander .......... H04N 5/4403 348/563 |
| 2011/0138317 | A1 | 6/2011 | Kang et al. |
| 2011/0138416 | A1* | 6/2011 | Kang .................... G06F 3/0482 725/39 |
| 2011/0138444 | A1* | 6/2011 | Kang ...................... G06F 21/10 726/3 |
| 2011/0304769 | A1 | 12/2011 | Kubota |
| 2011/0304778 | A1* | 12/2011 | Roberts .................. G08C 17/02 348/734 |
| 2012/0062796 | A1* | 3/2012 | Roberts ................ H04N 5/4403 348/569 |
| 2012/0089923 | A1* | 4/2012 | Pettit ..................... G06F 9/4445 715/746 |
| 2012/0140117 | A1* | 6/2012 | Waites .................... G08C 17/02 348/563 |
| 2012/0143945 | A1 | 6/2012 | Park |
| 2012/0173979 | A1* | 7/2012 | Lee ........................ G06F 9/4445 715/719 |
| 2012/0192245 | A1* | 7/2012 | Tsuchiya ............ H04N 21/4222 725/139 |
| 2012/0287350 | A1 | 11/2012 | Song et al. |
| 2013/0152135 | A1* | 6/2013 | Hong ................. H04N 21/4622 725/51 |
| 2013/0307785 | A1* | 11/2013 | Matsunaga ............ G08C 17/02 345/169 |
| 2014/0028714 | A1* | 1/2014 | Keating ................ G06T 19/006 345/633 |
| 2014/0123026 | A1* | 5/2014 | Cudak ................... G06F 3/0484 715/753 |
| 2014/0168523 | A1* | 6/2014 | Kwak .................. H04N 5/4403 348/734 |
| 2014/0211088 | A1* | 7/2014 | Arai .................... H04N 21/4126 348/552 |
| 2014/0244596 | A1* | 8/2014 | Cardonha ......... G06F 17/30477 707/689 |

FOREIGN PATENT DOCUMENTS

| | | |
|---|---|---|
| KR | 10-2005-0001702 A | 1/2005 |
| KR | 10-2008-0061046 A | 7/2008 |
| WO | 2012/101726 A1 | 8/2012 |

OTHER PUBLICATIONS

Written Opinion dated Mar. 31, 2014, issued by the International Searching Authority in counterpart International Application No. PCT/KR2013/011521.
Communication dated Apr. 3, 2014, issued by the European Patent Office in counterpart European Application No. 13196966.9.
Communication issued Dec. 21, 2015, issued by the European Patent Office in counterpart European Patent Application No. 13196966.9.
Communication issued Nov. 22, 2016, issued by the Australian Patent Office in counterpart Australian Patent Application No. 2013360531.

* cited by examiner

DISPLAY APPARATUS, REMOTE CONTROL APPARATUS, AND METHOD FOR PROVIDING USER INTERFACE USING THE SAME

CROSS-REFERENCE TO RELATED APPLICATION

This is a continuation of U.S. application Ser. No. 14/105,440, filed Dec. 13, 2013, in the United States Patent and Trademark Office, now allowed, which claims priority from Korean Patent Application No. 10-2012-0145695, filed on Dec. 13, 2012 in the Korean Intellectual Property Office, the disclosures of which are incorporated herein by reference in their entireties.

BACKGROUND

1. Field

Methods and apparatuses consistent with exemplary embodiments relate to a display apparatus, a remote control apparatus, and a method for providing a user interface (UI) using the same, and more particularly, to a display apparatus which is controlled by a remote control apparatus which provides a UI to receive a user command, a remote control apparatus, and a method for providing a UI using the same.

2. Description of the Related Art

With the development of electronic technologies, display apparatuses such as smart televisions (TVs) are able to execute various applications. For example, the smart TV may provide various types of content and amusements to users by executing a social network service (SNS)-related application, a game-related application, or a sports-related application.

However, although a different key (or button) is required in order to control each of the different applications, a related-art method attempts to control all of the applications using a single remote control apparatus. Therefore, the size of the remote control apparatus increases and the remote control apparatus is difficult to use.

Accordingly, there is a demand for a method for controlling all of the applications executable in a display apparatus more easily.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus and a remote control apparatus, which can provide a different UI screen to control each different application executable in the display apparatus, and a method for providing a UI using the same.

According to an aspect of an exemplary embodiment, there is provided a display apparatus which is controllable by a remote control apparatus, the display apparatus including: a communicator which communicates with the remote control apparatus; a storage which stores user interface (UI) screen information which is mapped to each application executable in the display apparatus; and a controller which, if a first application is executed based on a user command, controls a transmission of UI screen information corresponding to the first application from among the UI screen information stored in the storage to the remote control apparatus.

The UI screen information may include information on a plurality of keys which control the application, and arrangement information for the plurality of keys.

The UI screen information may include information on a UI screen image which includes a plurality of keys to control the first application, and information on the plurality of keys constituting the UI screen image.

If the first application is changed to a second application, the controller may control a transmission of UI screen information corresponding to the second application from among the UI screen information stored in the storage to the remote control apparatus.

According to an aspect of another exemplary embodiment, there is provided a remote control apparatus which controls a display apparatus, the remote control apparatus including: a display; a communicator which communicates with the display apparatus; and a controller which, if UI screen information corresponding to a first application which is being executed is received from the display apparatus, displays a UI screen to control the application based on the received UI screen information, wherein the UI screen information is mapped to each application executable in the display apparatus.

If the first application which is being executed in the display apparatus is changed to a second application, the controller may receive UI screen information corresponding to the second application and displays a UI screen to control the second application based on the received UI screen information.

The remote control apparatus may further include a storage which stores the received UI screen information, and, if an execution screen of the first application is displayed again on the display apparatus, the controller may display the UI screen using the stored UI screen information.

The UI screen information may include information on a plurality of keys to control the first application, and arrangement information of the plurality of keys.

The UI screen information may include information on a UI screen image which includes a plurality of keys to control the first application, and information on the plurality of keys constituting the UI screen image.

According to an aspect of still another exemplary embodiment, there is provided a method for providing a UI of a display apparatus which is controllable by a remote control apparatus, the method including: executing a first application; and transmitting UI screen information corresponding to the first application from among UI screen information which is mapped to each application executable in the display apparatus to the remote control apparatus.

The UI screen information may include information on a plurality of keys to control the first application, and arrangement information of the plurality of keys.

The UI screen information may include information on a UI screen image which includes a plurality of keys to control the application, and information on the plurality of keys constituting the UI screen image.

The transmitting may include, if the first application is changed to a second application, transmitting UI screen information corresponding to the second application from among the UI screen information which is mapped to each application executable in the display apparatus to the remote control apparatus.

According to an aspect of still another exemplary embodiment, there is provided a method for providing a UI of a remote control apparatus which controls a display apparatus, the method including: receiving UI screen information corresponding to a first application which is being executed from the display apparatus; and displaying a UI screen to control the first application based on the received UI screen information, wherein the UI screen information is mapped to each application executable in the display apparatus.

The method may further include: if the first application executed in the display apparatus is changed to a second application, receiving UI screen information corresponding to the second application; and displaying a UI screen to control the second application based on the received UI screen information.

The method may further include: storing the received UI screen information; and, if an execution screen of the first application is displayed again on the display apparatus, displaying the UI screen using the stored UI screen information.

The UI screen information may include information on a key which is necessary for controlling the application, and arrangement information of the key.

The UI screen information may include information on a UI screen image which includes a plurality of keys to control the application, and information on the plurality of keys constituting the UI screen image.

According to various exemplary embodiments described above, the UI screen displayed on the remote control apparatus is changed according to an application which is being executed in the display apparatus, and may receive a user command to control each application. Accordingly, the remote control apparatus is not required to include a separate key for driving all applications, and thus user's convenience in using the remote control apparatus can be improved.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
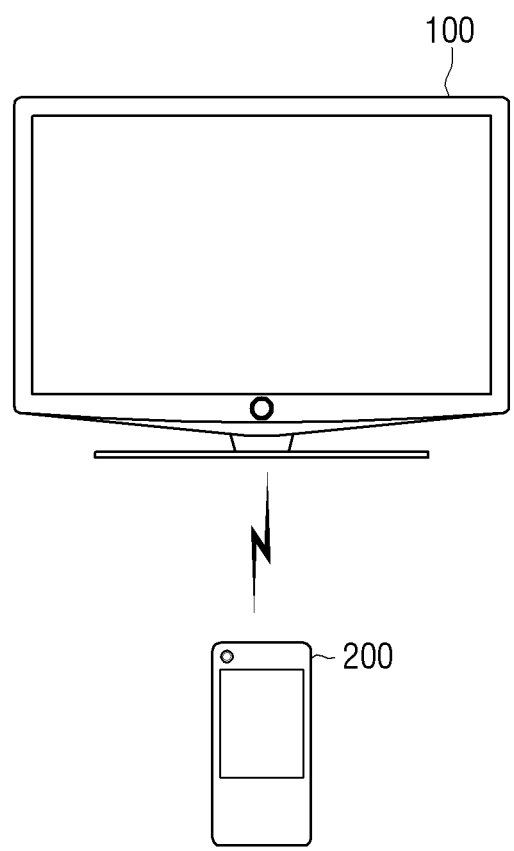
FIG. 1 is a view to explain a UI providing system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a view to explain a UI providing system according to an exemplary embodiment. Referring to FIG. 1, the UI providing system includes a display apparatus 100 and a remote control apparatus 200. The display apparatus 100 and the remote control apparatus 200 shown in FIG. 1 communicate with each other using a communication method such as Bluetooth, Zigbee, Wi-Fi, infrared communications, or radio frequency (RF) communications.

The display apparatus 100 may execute an application and may display a corresponding application execution screen. The application may be, for example, a program that can be executed by itself and may include a TV-related application, a social network service (SNS)-related application, a multimedia content-related application (for example, multimedia content such as music or a moving image), a game-related application, a sports-related application, and an education-related application. The applications can include various kinds of programs used by a user of the display apparatus.

The application may be installed in the display apparatus 100 at the time when the display apparatus 100 is manufactured, or may be received from an external server (not shown) and installed in the display apparatus 100.

The display apparatus 100 may transmit UI screen information corresponding to each application to the remote control apparatus 200. The UI screen information may include information for displaying a UI screen which receives a user command to control an application via the remote control apparatus 200.

Accordingly, the remote control apparatus 200 receives the UI screen information from the display apparatus 100, and may display a UI screen that is necessary for controlling an application which is being executed in the display apparatus 100. Therefore, the user may select various menus displayed on the application execution screen or may execute various functions provided by the application, through the UI screen which is displayed on the remote control apparatus 200.

As described above, in the UI providing system according to an exemplary embodiment, a UI screen for controlling each application which is being executed in the display apparatus 100 is displayed on the remote control apparatus 200. Accordingly, an interface that is optimized according to an application being executed can be provided to the user.

Figure 2:
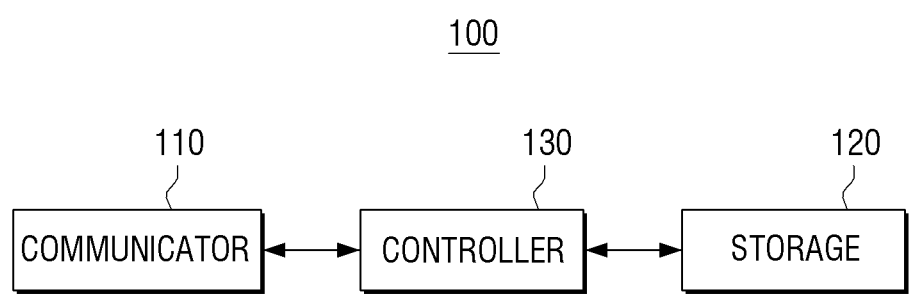
FIG. 2 is a block diagram to explain a display apparatus according to an exemplary embodiment.

FIG. 2 is a block diagram to explain a display apparatus according to an exemplary embodiment. Referring to FIG. 2, a display apparatus 100 is controllable by a remote control apparatus (for example, remote control apparatus 200 of FIG. 1) and includes a communicator 110, a storage 120, and a controller 130. The display apparatus 100 may be implemented by using a TV, but is not limited to a TV. The display apparatus 100 may be implemented by using various different apparatuses such as a desktop, a smart phone, a personal digital assistant (PDA), and a notebook computer.

The communicator 110 communicates with the remote control apparatus 200.

Specifically, the communicator 110 may communicate with the remote control apparatus 200 wirelessly according to a near field communication (NFC) method such as Bluetooth, Zigbee, infrared communications, and RF communications. To achieve this, the communicator 110 may include a communication module which is used for each communication method.

For example, if the communicator 110 communicates with the remote control apparatus 200 according to the Bluetooth communication method, the communicator 110 performs pairing with the remote control apparatus 200 through a Bluetooth communication module, and the communicator 110 is then ready to communicate with the remote control apparatus 200. Also, if the communicator 110 includes a Zigbee communication module, the communicator 110 performs pairing with the remote control apparatus 200 through the Zigbee communication module and is then ready to communicate with the remote control apparatus 200. If communication is performed according to infrared communications or RF communications, the communicator 110 performs communication by exchanging infrared ray signals or RF signals with the remote control apparatus 200.

The communicator 110 may communicate with the remote control apparatus 200 wirelessly using Wi-Fi. For example, the communicator 110 may be directly connected to the remote control apparatus 200 through a Wi-Fi communication module without passing through a separate network to communicate with the remote control apparatus 200, or the communicator 110 may access an access point (AP) through the Wi-Fi communication module and may communicate with the remote control apparatus 200 using a network. Also, the communicator 110 may communicate with the remote control apparatus 200 wirelessly through the Internet.

As described above, the communicator 110 may communicate with the remote control apparatus 200 using various communication methods.

The storage 120 stores UI screen information that is mapped onto each application executable in the display apparatus 100. The UI screen information may include information for displaying a UI screen to receive a user command which controls an application on the remote control apparatus 200.

Specifically, the UI screen information may include information on a key, further discussed below, which is necessary for controlling an application and arrangement information of the key. That is, the arrangement information of the key may include information on at least one of a size, a location, and a shape of the key. For example, the key could be of a particular width or height, could be positioned on the UI screen in a particular location, and could be of a particular shape corresponding to an application or program. The keys could be of varying shapes, such as circles, ovals, or squares. That is, the storage 120 may map a key necessary for controlling an application and information on a location of each key on the UI screen, a size of each key, and a shape of each key onto each application, and may store the mapped information. However, according to an exemplary embodiment, some piece of information of the above-described information may be omitted or other information may be added. For example, information on the shape may not be stored. In this case, the remote control apparatus 200 may display each key on the UI screen in a predetermined shape.

In this case, the storage 120 may map the UI screen information on the application onto a screen size of the remote control apparatus 200. Specifically, the storage 120 may map information on the location of each key on the UI screen and the size and shape of each key onto a screen size of the remote control apparatus 200, and may store the mapped information.

For example, the storage 120 may map information in such a manner that, if the remote control apparatus 200 is able to display a UI screen of a size of A×B, for example, a particular width and height, a specific key is displayed on the UI screen in a shape having a size of X from starting point a×b pixel. If the remote control apparatus 200 is able to display a UI screen having a size of C×D, a specific key is displayed on the UI screen in a shape having a size of Y from starting point c×d pixel. Therefore, the size of the UI screen can vary. Further, the size of the UI screen can be adjusted depending on the number of keys or types of content to be displayed on the UI screen.

The storage 120 may store information on a reference UI screen size. Specifically, the storage 120 may store information on a location of each key necessary for controlling an application on the reference UI screen, and a size and shape of each key. For example, the storage 120 may store information indicating that, if the reference UI screen has a size of A×B, a specific key is displayed on the reference UI screen with a size X from starting point a×b pixel.

The UI screen information may include information on a UI screen image which includes a key necessary for controlling an application, and information on the key constituting the image. The information on the key may include information on a type of the key included in the UI screen image and a location of the key on the UI screen image. That is, the storage 120 may store information on the UI screen image to receive a user command to control an application, a type of the key included in each UI screen image, and a location of each key on the UI screen image according to each application.

The storage 120 may store a control command to control an application. The control command may include a command to control an application.

Specifically, the storage 120 may map a control command to control each application onto a key, and may store the control command. For example, in the case of a moving image application, the storage 120 may map a control command to control the moving image application onto each key and may store the mapped control command. In the case of a game application, the storage 120 may map a control command to control the game application onto each key and may store the mapped control command.

The storage 120 may include a storage medium such as a flash memory type, a hard disk type, a multimedia card micro type, a memory of a card type (for example, a Secure Digital (SD) or Extreme Digital (XD) memory), a random access memory (RAM), and a read only memory (ROM).

The controller 130 controls an overall operation of the display apparatus 100. Specifically, the controller 130 may control the communicator 110 to communicate with the remote control apparatus 200. For example, if the communicator 110 communicates with the remote control apparatus 200 using a Bluetooth communication module provided therein, the controller 130 may control the communicator 110 to search for a communicable external apparatus using the Bluetooth communication module, to exchange a PIN code with the searched remote control apparatus 200, and to perform pairing with the remote control apparatus 200.

However, the controller 130 may control the communicator 110 to communicate with the remote control apparatus 200 in a communication method according to a type of the communication module provided in the communicator 110.

Also, if an application is executed based on a user command, the controller 130 may control the transmission of UI screen information corresponding to the executed application from among the UI screen information stored in the storage 120 to the remote control apparatus 200.

Specifically, the controller 130 may determine an application that is being executed and displays its execution screen, and may read out UI screen information mapped onto the determined application from the storage 120, and transmit the UI screen information to the remote control apparatus 200. For example, if a game application is driven and a game screen is displayed, the controller 130 may transmit UI screen information that is mapped onto the game application from among the UI screen information stored in the storage 120 to the remote control apparatus 200.

The controller 130 may control the transmission of UI screen information corresponding to a screen size of the remote control apparatus 200 to the remote control apparatus 200. Specifically, if information on the screen size of the remote control apparatus 200 is received, the controller 130 may control the transmission of the UI screen information corresponding to the received screen size from among the UI screen information, which is stored for each application according to a screen size of the remote control apparatus 200, to the remote control apparatus 200.

Also, the controller 130 may control the transmission of information on a reference UI screen size to the remote control apparatus 200. Specifically, the controller 130 may control the transmission of information on a key necessary for controlling an application, a location of each key displayed on the reference UI screen, and a size and shape of each key to the remote control apparatus 200 along with information on the reference UI screen size.

Also, the controller 130 may transmit information on the application corresponding to the UI screen information to the remote control apparatus 200. The information on the application may include at least one of a type, a name, and a serial number of the application. In this case, the remote control apparatus 200 may map the information on the application onto the UI screen information received from the display apparatus 100, and may store the mapped information.

The controller 130 may transmit a command to reset the UI screen information to the remote control apparatus 200. Specifically, if execution of the plurality of applications is stopped or a command to turn off the display apparatus 100 is input, the controller 130 may control the transmission of a command to reset the UI screen information stored in the remote control apparatus 200 to the remote control apparatus 200.

If an application currently being executed is changed to another application, the controller 130 may control the transmission of UI screen information corresponding to the other application from among the UI screen information stored in the storage 120 to the remote control apparatus 200.

Specifically, if the currently executed application is stopped, and if another application is executed and thus a corresponding application execution screen is displayed, the controller 130 may control the transmission of UI screen information corresponding to the currently displayed application from among the UI screen information stored in the storage 120 to the remote control apparatus 200.

Further, when multi-tasking, the controller 130 may control the transmission of the UI screen information to the remote control apparatus 200 even though the previously executed application has not stopped. Specifically, when multi-tasking, the controller is capable of controlling multiple applications at a same time.

Specifically, if the previously executed application has not stopped, but another application is being executed and a corresponding application execution screen is displayed, the controller 130 may control the transmission of UI screen information corresponding to the currently displayed application from among the UI screen information stored in the storage 120 to the remote control apparatus 200.

Also, if the application execution screen that was displayed previously is displayed again while the plurality of applications are being executed, the controller 130 may control the transmission of UI screen information corresponding to the currently displayed application from among the UI screen information stored in the storage 120 to the remote control apparatus 200. Specifically, if a multi-tasking function is executed, the execution screen of the previously executed application is no longer displayed and an execution screen of a newly executed application is displayed. After that, if the application execution screen that was displayed previously is displayed again according to a user command, the controller 130 may control the transmission of UI screen information corresponding to the re-displayed application to the remote control apparatus 200. That is, if the displayed application execution screen is changed while the plurality of applications are being executed, the controller 130 may control the transmission of UI screen information corresponding to the currently displayed application to the remote control apparatus 200.

In this case, the controller 130 may control the transmission of information on the currently displayed application to the remote control apparatus 200. The information on the application may include at least one of a type, a name, and a serial number of the application. Accordingly, the remote control apparatus 200 may determine the application that is currently displayed on the display apparatus 100 using the information on the application received from the display apparatus 100, and may display a UI screen corresponding to a result of the determination from among pre-stored UI screens.

The controller 130 may control the transmission of a control command to control an application to the remote control apparatus 200. The control command includes a command to control an application.

Specifically, the controller 130 may control the transmission of the control command which is mapped onto each key necessary for controlling the currently displayed application to the remote control apparatus 200. Accordingly, the remote control apparatus 200 may transmit a control command that is mapped onto a key selected by the user on the UI screen to the display apparatus 100 using the control command received from the display apparatus 100.

In this case, the controller 130 may perform an operation corresponding to the control command received from the remote control apparatus 200. For example, the controller 130 may control the selection of a variety of menus displayed on the application execution screen or may control performing a variety of operations executable in the application, such as a variety of functions provided by the application, according to the control command received from the remote control apparatus 200.

The controller 130 may perform an operation corresponding to key information received from the remote control apparatus 200. Specifically, if information on the key selected by the user on the UI screen is received from the remote control apparatus 200, the controller 130 may control the selection of a variety of menus displayed on the application execution screen or may control performing a variety of operations executable in the application, such as a variety of functions provided by the application, according to the key information. For example, if information on a stop key is received from the remote control apparatus 200 while a moving image application is being executed, the controller 130 may stop reproducing a moving image which is being reproduced through the moving image application.

Figure 3:
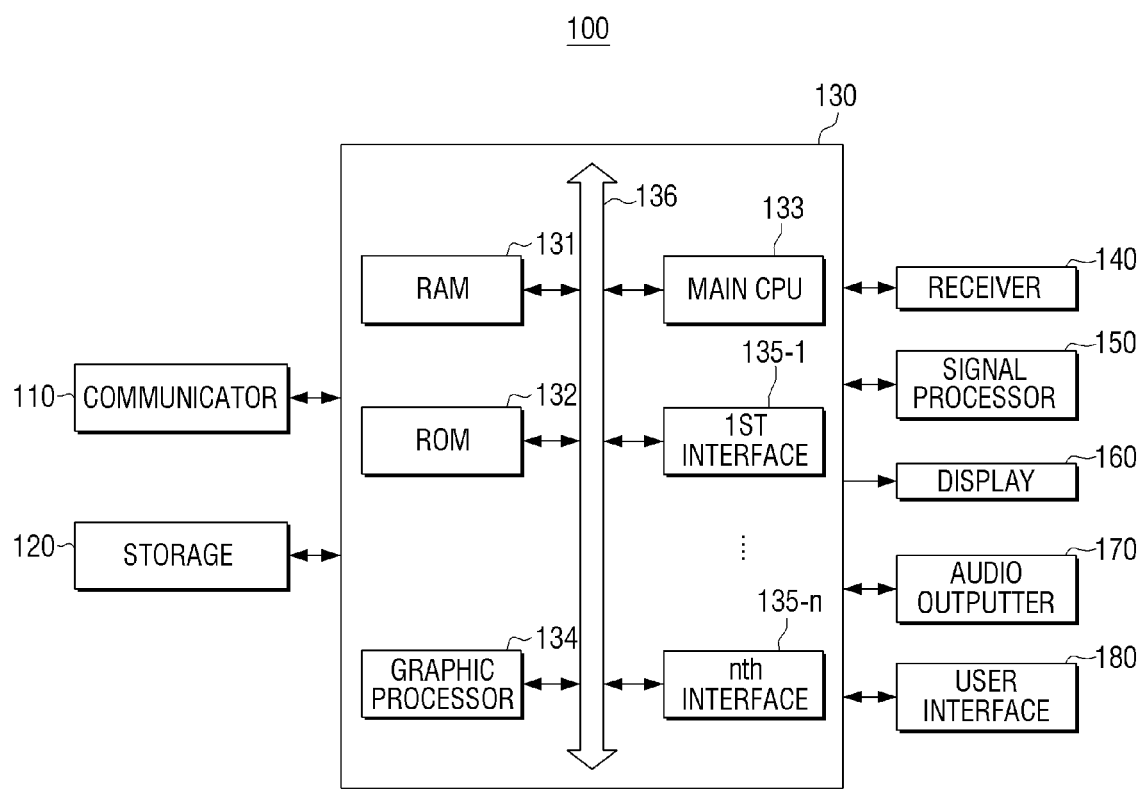
FIG. 3 is a block diagram to explain the display apparatus in detail according to an exemplary embodiment.

FIG. 3 is a block diagram to explain the display apparatus in detail according to an exemplary embodiment. Referring to FIG. 3, the display apparatus 100 includes a communicator 110, a storage 120, a controller 130, a receiver 140, a signal processor 150, a display 160, an audio outputter 170, and a user interface 180.

The receiver 140 receives various types of content. Specifically, the receiver 140 receives content from a broadcasting station which transmits a broadcast program content using a broadcasting network or from a web server which transmit a content file using the Internet. The receiver 140 may receive content from various recording medium reproducing apparatuses provided in or connected to the display apparatus 100. The recording medium reproducing apparatus refers to an apparatus that reproduces content stored in various kinds of recording media such as a compact disk (CD), a digital versatile disk (DVD), a hard disk, a blue-ray disk, a memory card, or a USB memory.

In an exemplary embodiment in which content is received from a broadcasting station, the receiver 140 may include a tuner (not shown), a demodulator (not shown), and an equalizer (not shown). On the other hand, in an exemplary embodiment in which content is received from a source, such as a web server, the receiver 140 may be implemented by using a network interface card (not shown). Also, in an exemplary embodiment in which content is received from various kinds of recording medium reproducing apparatuses, the receiver 140 may be implemented by using an interface (not shown) connected to a recording medium reproducing apparatus. As described above, the receiver 140 may be implemented in various forms according to exemplary embodiments.

The signal processor 150 signal-processes the content received through the receiver 140 so that the content is output through the display 160.

Specifically, the signal processor 150 performs various image processing operations such as decoding, scaling, noise filtering, frame rate conversion, and resolution conversion with respect to a video signal included in the content, so that the video signal is converted into a form that can be output by the display 160. Also, the signal processor 150 may perform various signal processing operations such as decoding, amplifying, and noise filtering with respect to an audio signal included in the content, so that the audio signal is converted into a form that can be output by the audio outputter 170.

The display 160 outputs various video signals which have been processed by the signal processor 150. Also, the display 160 may display various application execution screens of applications executed according to user commands.

To achieve this, the display 160 may be implemented by using a liquid crystal display (LCD), an organic light emitting display (OLED), or a plasma display panel (PDP), and may provide various display screens that can be provided through the display apparatus 100.

The audio outputter 170 may output various notification sounds or voice messages in addition to various audio signals processed by the signal processor 150.

The user interface 180 receives various user commands and transmits them to the controller 130. To achieve this, the user interface 180 may be implemented by using an input panel and may receive various user commands to control functions of the display apparatus 100. The input panel may be a touch pad, a key pad, or a touch screen that is equipped with various function keys, number keys, special keys, and character keys. However, the input panel is not limited to these exemplary embodiments and various kinds of input devices can be used.

The communicator 110 may receive various user commands to control functions of the display apparatus 100 from the remote control apparatus 200, and may transmit the user commands to the controller 130.

In the above exemplary embodiment, if the display apparatus 100 is a smart TV, the user command may include a user command to control functions of the smart TV, such as powering the smart TV on and off, changing a channel, and controlling the volume. In this case, the controller 130 may control the other elements to perform various functions corresponding to the user commands input through the communicator 110 or the user interface 180.

In particular, the communicator 110 and the user interface 180 may receive a command to execute an application which is executable in the display apparatus 100. In this case, the controller 130 may execute an application corresponding to the user command input through the communicator 110 or the user interface 180, and may display an execution screen on the display 160.

The storage 120 may store an operating system (OS) software module to drive the display apparatus 100, various applications, and various data or content which are input or set when the application is executed.

The controller 130 may control the overall operation of the display apparatus 100 using various programs stored in the storage 120.

Specifically, the controller 130 includes a RAM 131, a ROM 132, a main CPU 133, a graphic processor 134, first to nth interfaces 135-1~135-n, and a bus 136.

The RAM 131, the ROM 132, the main CPU 133, the graphic processor 134, and the first to nth interfaces 135-1~135-n are connected to one another through the bus 136.

The first to nth interfaces 135-1 to 135-n are connected to the above-described various elements. One of the interfaces may be a network interface which is connected to an external apparatus through a network.

The main CPU 133 accesses the storage 120 and performs booting using the O/S stored in the storage 120. The main CPU 133 may perform various operations using various applications, programs, content, and data stored in the storage 120.

The ROM 132 stores a set of commands for booting the system. If a command to turn on the display apparatus 100 is input and power is supplied, the main CPU 133 copies the OS stored in the storage 120 into the RAM 131, executes the OS and boots the system according to the command stored in the ROM 132. If booting is completed, the main CPU 133 copies various application programs stored in the storage 120 into the RAM 131, executes the application programs copied into the RAM 131, and performs various operations.

The graphic processor 134 generates a screen including various objects such as an icon, an image, and text, and an application execution screen, using a calculator (not shown) and a renderer (not shown). The calculator (not shown) calculates attribute values, such as coordinates, shape, size, and color of each object to be displayed, according to a layout of the screen using a control command received from the graphic processor 134. The renderer (not shown) generates a screen of various layouts including objects based on the attribute values calculated by the calculator (not shown). The screen generated by the renderer (not shown) may be displayed on the display 160.

FIG. 3 illustrates examples of elements included in the display apparatus 100. Some of the elements of FIG. 3 may be omitted or changed, or another element may be added according to exemplary embodiments. For example, if the display apparatus 100 is implemented by using a smartphone, the display apparatus 100 may further include a GPS receiver (not shown) to calculate a current location of the display apparatus 100.

Figure 4:
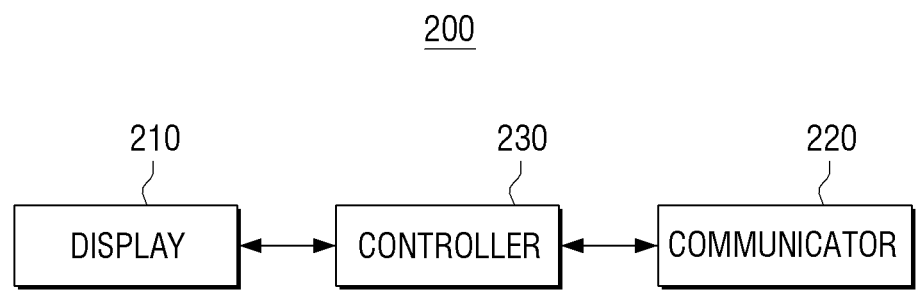
FIG. 4 is a block diagram to explain a remote control apparatus according to an exemplary embodiment.

FIG. 4 is a block diagram to explain a remote control apparatus according to an exemplary embodiment. Referring to FIG. 4, a remote control apparatus 200 includes a display 210, a communicator 220, and a controller 230.

In this case, the remote control apparatus 200 may be implemented by using a remote controller for controlling the display apparatus 100. However, this should not be considered as limiting. The remote control apparatus 200 may be implemented by using a smartphone, a tablet PC, or a PDA, which can execute an application for controlling the display apparatus 100 (for example, a remote control application).

The display 210 can display various screens. Specifically, the display 210 may display a UI screen to receive a user command to control an application displayed on the display apparatus (for example, the display apparatus 100 of FIGS. 1 to 3).

The display 210 may be implemented by using a touch screen which forms a layer structure with a touch pad. In this case, the display 210 may receive a user command while displaying the screen. The display 210 may detect a touch input location and a touch input area as well as a touch input pressure, and may provide a result of the detection to the controller 230.

The communicator 220 communicates with the display apparatus 100.

Specifically, the communicator 220 may communicate with the display apparatus 100 wirelessly according to an NFC method such as Bluetooth, Zigbee, infrared communications, and RF communications. To achieve this, the communicator 220 may include a communication module which is used in each communication method.

For example, if communication is performed in the Bluetooth communication method, the communicator 220 performs pairing with the display apparatus 100 through a Bluetooth communication module, and is ready to communicate with the display apparatus 100. If the remote control apparatus 200 is provided with a Zigbee communication module, the communicator 220 performs pairing with the display apparatus 100 through the Zigbee communication module, and is ready to communicate with the display apparatus 100. If communication is performed in the infrared communication or RF communications, the communicator 220 may perform communication by exchanging infrared ray signals or RF signals with the display apparatus 100.

The communicator 220 may communicate with the display apparatus 100 wirelessly using Wi-Fi. For example, the communicator 220 may be directly connected to the display apparatus 100 via a Wi-Fi communication module without passing through a separate network and may communicate with the display apparatus 100, or may be connected to a network using an access point (AP) and communicate with the display apparatus 100. Also, the communicator 210 may communicate with the display apparatus 100 wirelessly through the internet.

As described above, the communicator 220 may communicate with the display apparatus 100 using various communication methods.

The controller 230 controls an overall operation of the remote control apparatus 200. Specifically, the controller 230 may control the communicator 220 to communicate with the display apparatus 100. For example, if the communicator 220 communicates with the display apparatus 100 through the Bluetooth communication module, the controller 230 may control the communicator 220 to search for a communicable external apparatus using the Bluetooth communication module, and to exchange a PIN code with the searched display apparatus 100, and may perform pairing with the display apparatus 100.

However, the controller 230 may control the communicator 220 to communicate with the display apparatus 100 in a communication method provided by a communication module which is provided in the communicator 220, besides the above-described method.

If UI screen information corresponding to an application which is being executed is received from the display apparatus 100, the controller 230 may control to display a UI screen to control the application based on the received UI screen information. That is, the controller 230 may control the UI screen to control the application using the UI screen information.

The UI screen information may be screen information that is mapped onto each application which is executable in the display apparatus 100. That is, the display apparatus 100 may store UI screen information for each executable application and may transmit UI screen information corresponding to a currently displayed application to the remote control apparatus 200. Accordingly, the remote control apparatus 200 may output a UI screen to control the application currently displayed on the display apparatus 100 based on the received UI screen information.

Specifically, the UI screen information includes information on a key necessary for controlling an application and arrangement information of the key. The arrangement information of the key may include at least one of a size, a location, and a shape of the key. Accordingly, the controller 230 determines a location of the key for controlling the application on the display 210, and a size and shape of each key, and controls the generation of a UI screen for controlling the application based on a result of the determining and display the UI screen. That is, the controller 230 may generate a UI screen to correspond to a screen size of the display 210 based on the received UI screen information.

The controller 230 may control the reception of UI screen information corresponding to the screen size of the display 210. Specifically, the controller 230 may control the transmission of information on the screen size of the display 210 to the display apparatus 100 and may receive UI screen information corresponding to the screen size of the display 210. Accordingly, the controller 230 determines a location of the key for controlling the application on the display 210, and a size and shape of each key based on the UI screen information corresponding to the screen size of the display 210. Therefore, the controller 230 controls the generation and display of a UI screen for controlling the application. That is, the controller 230 may generate a UI screen to be consistent with the screen size of the display 210 based on the UI screen information already set in the display apparatus 100.

If information on a reference UI screen size is received from the display apparatus 100, the controller 230 may generate a UI screen for controlling an application using the information on the reference UI screen size. Specifically, the controller 230 determines a location of each key for controlling the application on the display 210, and a size and shape of each key by comparing the reference UI screen size and the screen size of the display 210. Accordingly, the controller 230 controls the generation and display of a UI screen for controlling the application. That is, the controller 230 may generate a UI screen to correspond to the screen size of the display 210 based on the received reference UI screen size.

The UI screen information may include information on a UI screen image including a key necessary for controlling an application, and information on the key constituting the image. The information on the key may include information on a type of the key included in the UI screen image and information on a location of the key on the screen image. Accordingly, the controller 230 may control the generation of a UI screen by adjusting or scaling the size of the UI screen image received from the display apparatus 100 according to the screen size of the display 210, and may control the display of the generated UI screen on the display 210.

If an application which is being executed in the display apparatus is changed to another application, the controller 230 may receive UI screen information corresponding to the changed application and may display a UI screen which controls the other application based on the received UI screen information.

That is, if a displayed application execution screen is changed, the display apparatus 100 transmits UI screen information corresponding to the currently displayed application to the remote control apparatus 200, as described above with reference to FIG. 2. In this case, the controller 230 may control the generation of a UI screen again based on the received UI screen information and displays the UI screen. Accordingly, the user can control the application currently displayed on the display apparatus 100 using the UI screen displayed on the remote control apparatus 200.

The controller 230 may control the application executed in the display apparatus 100 based on a user command which is input on the UI screen displayed on the display 210.

Specifically, the controller 230 may control the transmission of a control command corresponding to a key selected on the UI screen to the display apparatus 100, using a control command received from the display apparatus 100. Also, the controller 230 may control the transmission of information on the key selected on the UI screen to the display apparatus 100. That is, the controller 230 may determine the key selected on the UI screen using location information of each key included in the UI screen information, and may control the transmission of information on the selected key to the display apparatus 100. However, a pre-stored control command may be used according to an exemplary embodiment. For example, if a control command corresponding to each key is pre-stored, the controller 230 may control the transmission of a control command corresponding to the key selected on the UI screen to the display apparatus 100 using the pre-stored control command.

Accordingly, the display apparatus 100 may control an operation of the application based on the received control command or information on the key. For example, when the display apparatus 100 displays an execution screen of a game application, if the display apparatus 100 receives a control command from the remote control apparatus 200 to move an object displayed on the game execution screen, for example, a character of the game, the display apparatus 100 may move the object displayed on the game execution screen according to the received control command. Also, when the display apparatus 100 displays an execution screen of a moving image application, if the display apparatus 100 receives information indicating that a replay key is selected from the remote control apparatus 200, the display apparatus 100 may reproduce a moving image according to the information from the replay key.

As described above, the remote control apparatus 200 may be implemented by using a remote controller for controlling the display apparatus 100. However, the remote control apparatus 200 may be implemented by using a smartphone, a tablet PC or a PDA, which can execute an application (for example, a remote control application) for controlling the display apparatus 100. In this case, the controller 230 executes a remote control application according to a user command and may control an application which is being executed in the display apparatus 100.

For example, the controller 230 may execute the remote control application and may display a corresponding execution screen on the display 210. After that, if information on a name of an application installed in the display apparatus 100 and an icon corresponding to the application is received from the display apparatus 100, the controller 230 may control the display 210 to display a list including the information. If one application is selected from the list, the controller 230 transmits a control command to the display apparatus 100 to execute the selected application and may control the execution of the selected application. After that, if UI screen information is received from the display apparatus 100, the controller 230 may control the display of a UI screen to control the application using the received UI screen information.

Figure 5:
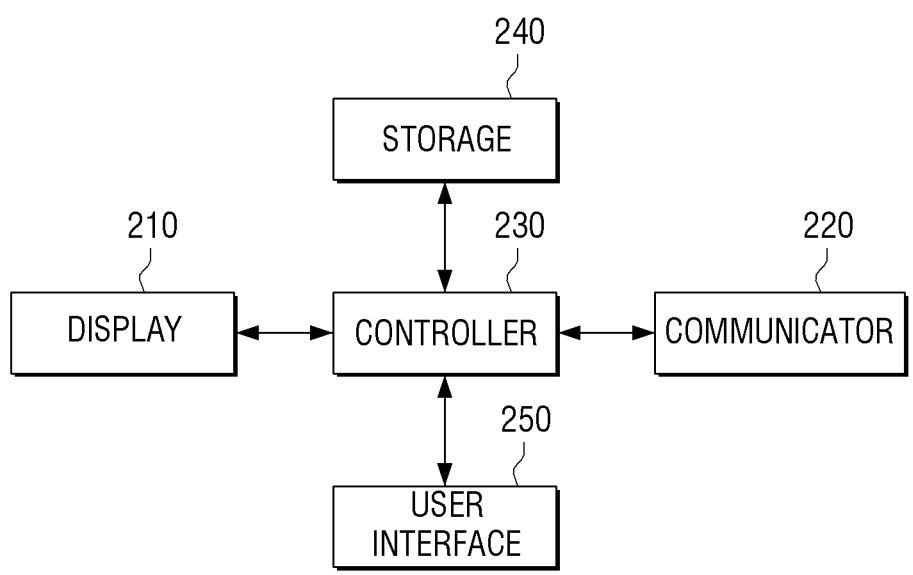
FIG. 5 is a block diagram to explain the remote control apparatus in detail according to an exemplary embodiment.

FIG. 5 is a block diagram to explain the remote control apparatus in detail according to an exemplary embodiment. Referring to FIG. 5, the remote control apparatus 200 includes a display 210, a communicator 220, a controller 230, a storage 240, and a user interface 250. The same elements of FIG. 5 which are the same as those of FIG. 4 will not be explained in detail.

The storage 240 stores received UI screen information. Specifically, if UI screen information and information on an application are received from the display apparatus 100, the storage 240 may map the information on the application onto the UI screen information and store the mapped information.

To achieve this, the storage 240 may include a storage medium of at least one type including a flash memory type, a hard disk type, a multimedia card micro type, a memory of a card type (for example, an SD or XD memory), a RAM, and a ROM.

Accordingly, if an application execution screen is displayed on the display apparatus 100 again, the controller 230 may display a UI screen using the stored UI screen information.

Specifically, if the display apparatus 100 displays the application execution screen that has been previously displayed, while executing a plurality of applications according to a multi-tasking function, the display apparatus 100 may transmit information on the re-displayed application to the remote control apparatus 200. In this case, the controller 230 may determine UI screen information that is mapped onto the received application information from among the UI screen information stored in the storage 240, and may control the generation and display of a UI screen based on the determined UI screen information.

The controller 230 may reset the UI screen information stored in the storage 240. Specifically, if a command to turn off the remote control apparatus 200 is input or a command to reset the remote control apparatus 200 is received from the display apparatus 100, the controller 230 may reset the UI screen information stored in the storage 240. If the plurality of applications which are being executed in the display apparatus 100 are stopped or a command to turn off the display apparatus 100 is input, the display apparatus 100 may transmit a reset command to the remote control apparatus 200. The controller 230 resets the UI screen information stored in the storage 240 and may control the storage of UI screen information which is received afterwards in the storage 240.

The user interface 250 is an element for receiving a user command. Specifically, the user interface 250 may receive a user command to control an application which is being executed in the display apparatus 100. To achieve this, the user interface 250 may be implemented by using a touch pad or a key pad or a touch screen which is equipped with various function keys, number keys, special keys, and character keys.

In particular, the user interface 250 may be implemented by using a touch screen along with the display 210, and may display a UI screen to receive a user command to control an application. If a key is selected on the UI screen by the user, the user interface 250 may transmit a result of the key selection to the controller 230.

Accordingly, the controller 230 may control the display apparatus 100 according to a user command input through the UI screen. Specifically, the controller 230 may transmit a control command that is mapped onto a key selected on the UI screen or information on the key to the display apparatus 100, and may control the selection of a variety of menus displayed on an application execution screen displayed on the display apparatus 100 or may perform various operations executable in the application, such as various functions provided by the application. The menu displayed on the display apparatus could vary based on the program being executed and displayed.

Also, the user interface 250 may receive various user commands. If the display apparatus 100 is implemented by using a smart TV, the user command may include a user command to control functions of the smart TV, such as powering the smart TV on or off, changing a channel, and controlling the volume. To achieve this, the controller 230 may control the display of a UI screen to receive the above-described user command, and may control the communicator 210 to transmit a control command corresponding to a user command input through the user interface 250 to the display apparatus 100.

In particular, the user interface 250 may receive a user command to execute an application which is installed in the display apparatus 100, and the controller 230 may control the transmission of a control command to execute the application selected by the user command to the display apparatus 100.

FIGS. 6A, 6B, 7 and 8 are views to explain a method for providing a UI according to an exemplary embodiment.

Figure 6A:
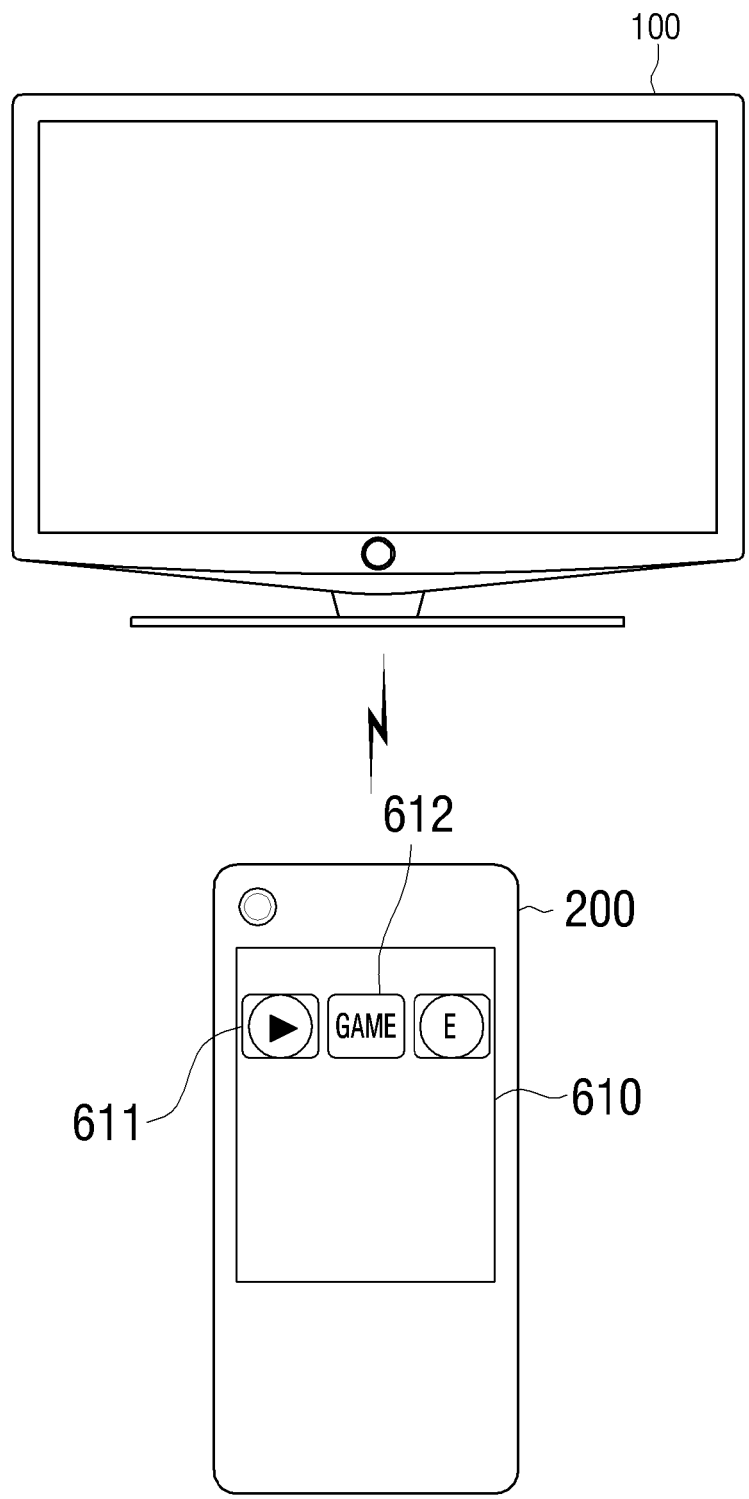
FIGS. 6A, 6B, 7 and 8 are views to explain a method for providing a UI according to an exemplary embodiment.

First of all, as illustrated in FIG. 6A, the remote control apparatus 100 may display a UI screen 610 to receive a user command to execute an application installed in the display apparatus 100. In this case, the UI screen 610 may consist of icons corresponding to each application installed in the display apparatus 100, and information regarding each application installed in the display apparatus may be received from the display apparatus 100.

Accordingly, a user may select an icon formed on the UI screen 610 to execute a desired application on the display apparatus. For example, if an icon 611 corresponding to a video application is selected, the remote control apparatus 200 transmits a control command to execute the video application to the display apparatus 100, and the display apparatus 100 may display an execution screen of the video application by executing the video application according to the received control command. In another example, if an icon 612 corresponding to a game application is selected, the remote control apparatus 200 transmits a control command to execute the game application to the display apparatus 100, and the display apparatus 100 may display an execution screen of the game application by executing the game application according to the received control command.

However, this is only an example, and a user may execute a desired application using various other methods.

Figure 6B:
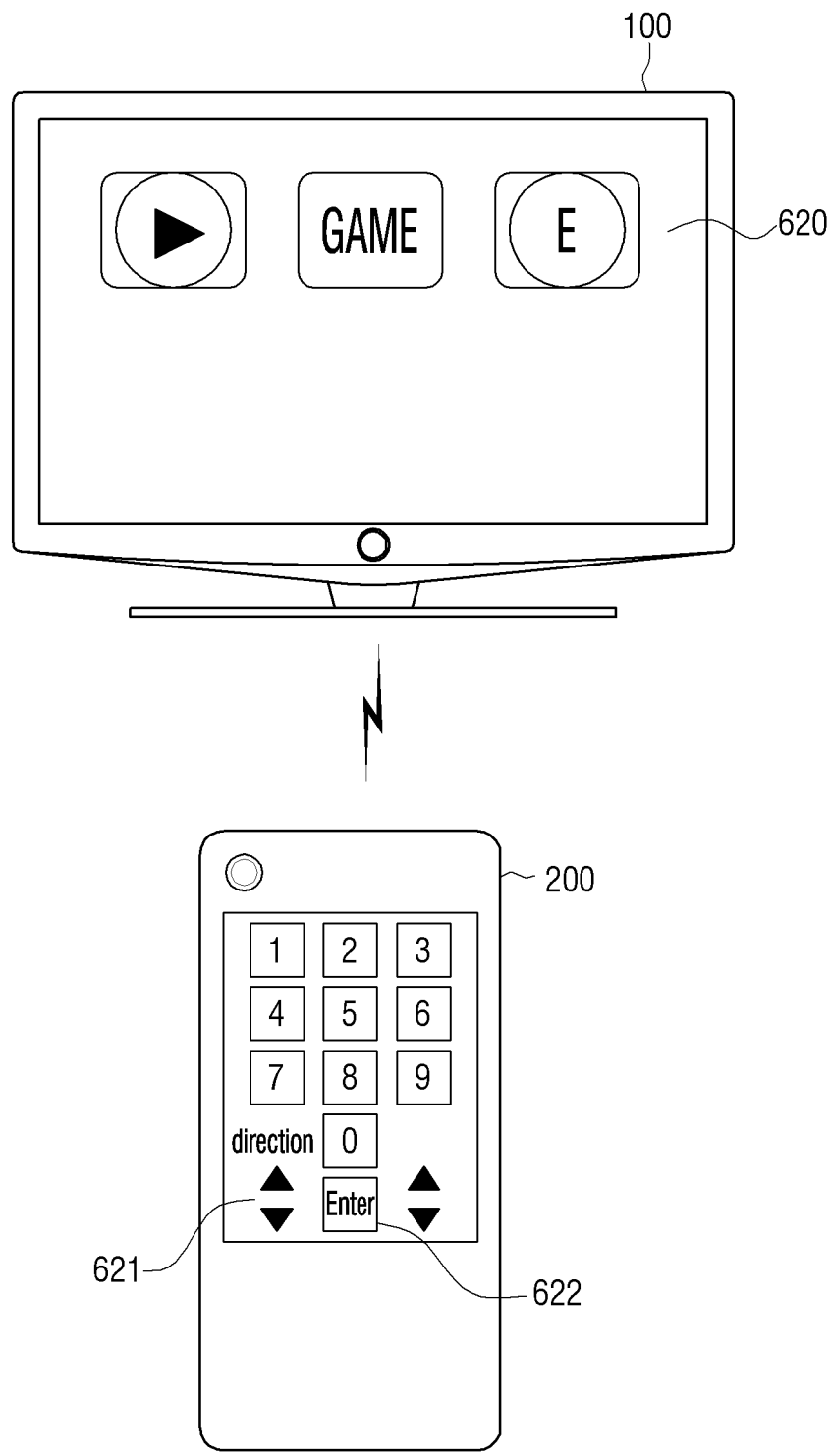

For example, as illustrated in FIG. 6B, when a list 620 regarding applications of the display apparatus 100 is displayed, a user may move a highlight on the list to a desired application using a direction key 621 on the remote control apparatus 200, and may execute an application where the highlight is located using the Enter key 622. In this case, the list regarding the applications of the display apparatus 100 may include an icon, a title, etc. corresponding to each application.

Figure 7:
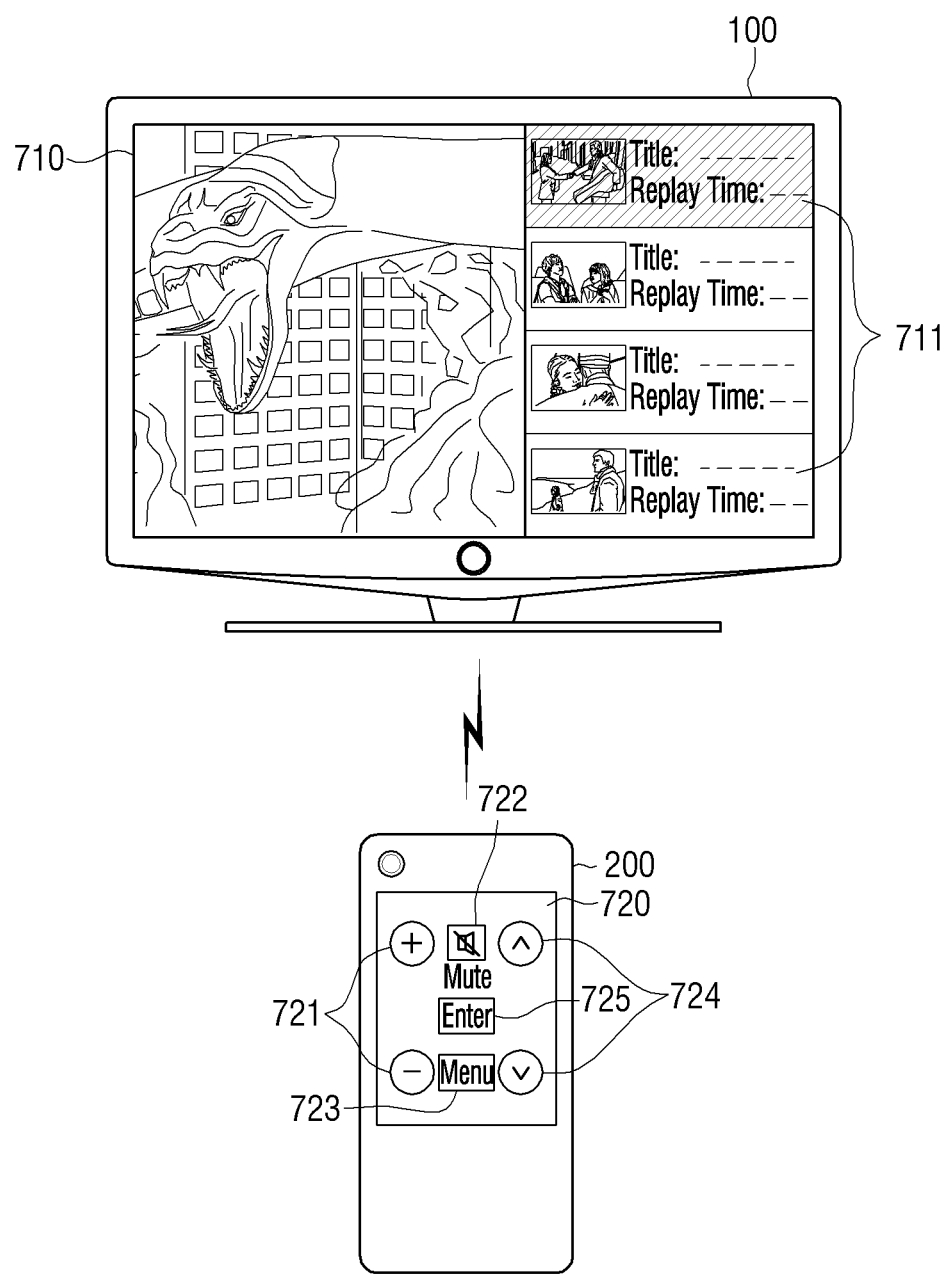

If a moving image application, for example, multimedia content such as a movie or TV program, is executed in the display apparatus 100, the display apparatus 100 displays a moving image application execution screen 710 as shown in FIG. 7, The display apparatus 100 transmits UI screen information corresponding to the moving image application to the remote control apparatus 200. Accordingly, the remote control apparatus 200 displays a UI screen 720 including a variety of keys or control commands for controlling the moving image application based on the received UI screen information.

For example, the UI screen 720 of the remote control apparatus 200 may include a volume control key 721, a mute key 722, a menu key 723, a direction key 724, and a selection key 725 for controlling the moving image application. However, some of the aforementioned keys may be omitted or other keys may be added and can vary depending on the type of application.

Accordingly, if a key displayed on the UI screen 720 is selected by the user, the remote control apparatus 200 may control the display apparatus 100 to perform an operation corresponding to the selected key. For example, if the user selects the menu key 723, the remote control apparatus 200 may control the display apparatus 100 to display a list of moving images 711 that can be provided by the moving image application on the execution screen 710. If the direction key 724 is selected, the remote control apparatus 200 highlights an item on the list 711 according to the selected direction key 724, and, if the selection key 725 is selected, the remote control apparatus 200 may control the display apparatus 100 to display a moving image according to the highlighted item. Also, if the volume control key 721 is selected, the remote control apparatus 200 controls a volume of a moving image that is being reproduced by the moving image application. If the mute key 722 is selected, the remote control apparatus 200 may control the display apparatus to mute the volume of the moving image displayed in the display apparatus 100.

However, the above-described functions that are performed with the moving image application according to each key is merely an example and a different function may be mapped onto each key.

Figure 8:
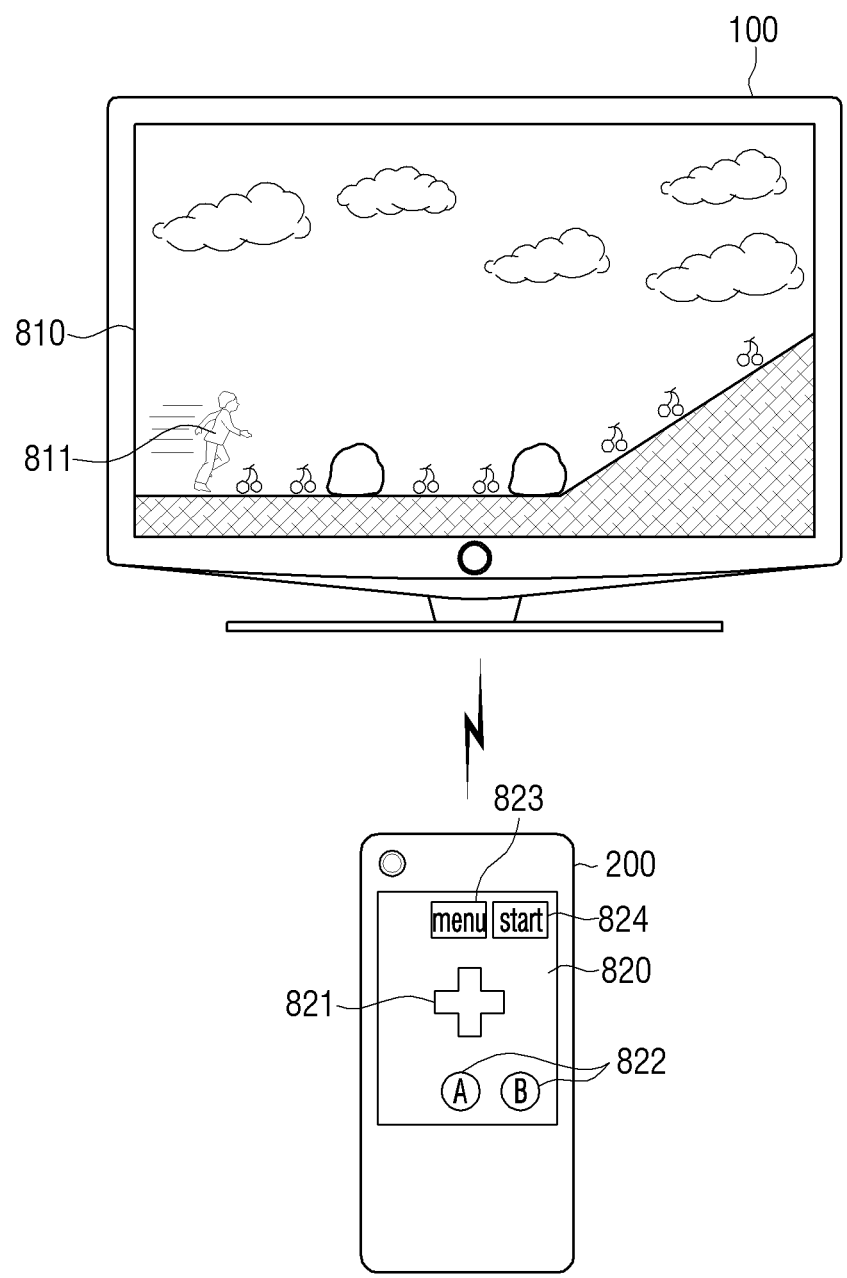

If a game application is executed in the display apparatus 100, the display apparatus 100 displays a game application execution screen 810 as shown in FIG. 8, the display apparatus 100 transmits UI screen information corresponding to the game application to the remote control apparatus 200. Accordingly, the remote control apparatus 200 may display a UI screen 820 including a variety of keys for controlling the game application based on the received UI screen information.

For example, the UI screen 820 may include a direction key 821, an action key 822, a menu key 823 and a start key 824. However, some of the aforementioned keys may be omitted or other keys may be added according to an exemplary embodiment. Various types of keys can be included for controlling and playing the game application.

Accordingly, if the user selects a key displayed on the UI screen 820, the remote control apparatus 200 may control the display apparatus 100 to perform an operation corresponding to the selected key. For example, if the user selects the direction key 821, the remote control apparatus 200 may control the display apparatus 100 to move a specific object 811 on the game application execution screen 810 in a selected direction and display the object. If the action key 822 is selected, the remote control apparatus 200 controls the display apparatus 100 such that the specific object 811 performs an operation that is mapped to each action key 822. If the start key 824 is selected, the remote control apparatus 200 may control the display apparatus 100 to pause the game application execution screen. Also, if the menu key 823 is selected, the remote control apparatus 200 may control the display apparatus 100 to display a list of games, that can be provided by the game application, on the execution screen 810.

However, the above-described functions that are performed by each key are merely examples and a different function may be mapped to each key.

As described above, the UI screen displayed on the remote control apparatus 200 may be changed according to an application which is displayed on the display apparatus 100. Accordingly, even if the remote control apparatus 200 does not include separate keys for driving all of the applications, the user can control the application executable in the display apparatus 100 more easily using the remote control apparatus 200, which displays a UI screen to control each application.

Figure 9:
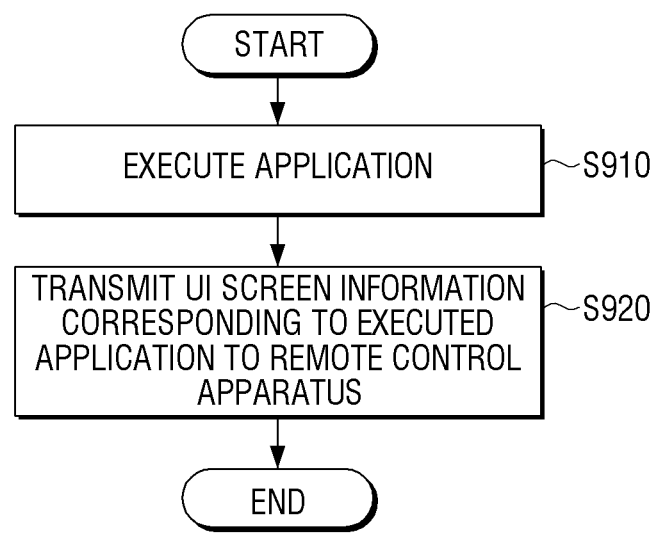
FIG. 9 is a flowchart to explain a method for providing a UI of a display apparatus which is controllable by a remote control apparatus according to an exemplary embodiment.

FIG. 9 is a flowchart to explain a method for providing a UI of a display apparatus which is controllable by a remote control apparatus according to an exemplary embodiment.

First, an application is executed based on a user command (S910).

After that, the display apparatus transmits UI screen information, corresponding to the executed application from among UI screen information mapped onto executable applications, to the remote control apparatus (S920). The display apparatus may store the UI screen information that is mapped to each application executable in the display apparatus.

The UI screen information may include information on a key necessary for controlling an application and arrangement information of the key. The arrangement information of the key may include information of at least one of a size, a location, and a shape of the key.

The UI screen information may include information on a UI screen image including a key necessary for controlling an application and information on the key constituting the image. The information on the key may include information on a type of key included in the UI screen image and information on a location of the key on the UI screen image.

If the executed application is changed to another application in operation S920, the display apparatus may transmit UI screen information, corresponding to the other application from among the UI screen information mapped to executable applications, to the remote control apparatus.

Specifically, if the application that is currently being executed has stopped and another application is executed and thus a corresponding application execution screen is displayed, the display apparatus may transmit UI screen information corresponding to the currently displayed application to the remote control apparatus. Also, in the state in which the previously executed application is not stopped, if an execution screen of another application is displayed, the display apparatus may transmit UI screen information corresponding to a currently displayed application to the remote control apparatus.

Figure 10:
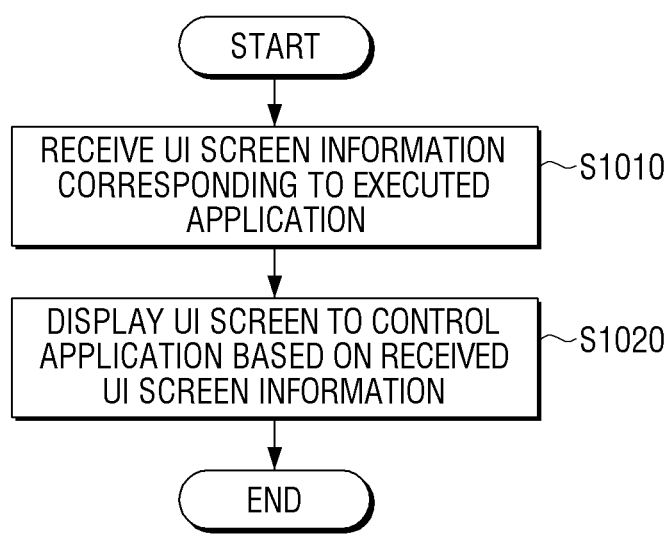
FIG. 10 is a flowchart to explain a method for providing a UI of a remote control apparatus which controls a display apparatus according to an exemplary embodiment.

FIG. 10 is a flowchart to explain a method for providing a UI of a remote control apparatus which controls a display apparatus according to an exemplary embodiment.

First, the remote control apparatus receives UI screen information corresponding to an application which is being executed from the display apparatus (S1010).

After that, the remote control apparatus displays a UI screen to control the application based on the UI screen information (S1020).

The UI screen information may be screen information that is mapped to each application executable in the display apparatus. That is, the display apparatus stores UI screen information for each executable application and may transmit UI screen information corresponding to a currently displayed application to the remote control apparatus. Accordingly, the remote control apparatus may output a UI screen to control the application which is being currently displayed based on the received UI screen information.

Specifically, the UI screen information may include information on a key necessary for controlling an application and arrangement information of the key. The information on the key may include information on at least one of a size, a location, and a shape of the key.

The UI screen information may include information on a UI screen image including a key necessary for controlling an application and information on the key constituting the image. The information on the keys may include information on a type of the keys included in the UI screen image and information on a location of the keys on the UI screen image.

If the executed application is changed to another application, the remote control apparatus receives UI screen information corresponding to the other application and may display a UI screen to control the another application based on the received UI screen information.

Specifically, if the application that is currently being executed is stopped and another application is executed and thus a corresponding application execution screen is displayed, or, in a state in which the currently executed application has not stopped, if an execution screen of another application is displayed, the display apparatus may transmit UI screen information corresponding to a currently displayed application to the remote control apparatus. Accordingly, the remote control apparatus may display a UI screen to control the application which is being currently displayed using the received UI screen information.

If the received UI screen information is stored and the application execution screen is displayed again on the display apparatus, a UI screen may be displayed using the stored UI screen information. In the above example, if the previously displayed application execution screen is displayed again when a plurality of applications are being executed according to a multi-tasking function, the display apparatus may transmit information on the re-displayed application to the remote control apparatus. Accordingly, the remote control apparatus may display a UI screen to control the application which is currently displayed using the information on the application which is received from the display apparatus.

As described above, the UI screen that is displayed on the remote control apparatus may be changed according to an application that is displayed on the display apparatus. Accordingly, even if the remote control apparatus does not include a separate key for driving all of the applications, the user can control the application executable in the display apparatus more easily through the remote control apparatus, which displays a UI screen to control each of the different applications.

A non-transitory computer readable medium, which stores a program for performing the method for providing the UI according to the exemplary embodiment in sequence, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although a bus is not illustrated in the block diagram illustrating the display apparatus, communications among the elements of the display apparatus may be performed through a bus. Also, the display apparatus may further include a processor to perform the above-described various operations such as a Central Processing Unit (CPU) or a micro processor.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A remote control apparatus for controlling an external display apparatus, the remote control apparatus comprising:
  a display;
  a storage configured to store a plurality of user interface screens;
  a communicator configured to communicate with the external display apparatus; and
  a controller configured to:
    generate mapping information indicating relationships between applications that are executable in the display apparatus and the plurality of UI screens of the applications stored in the storage, and
    receive identification information of an application which is being executed in the external display apparatus from the external display apparatus,
    select a UI screen from among the plurality of UI screens stored in the storage based on the identification information and the mapping information, and
    control the display to display the UI screen such that the application executed in the external display apparatus is controlled by a command received via the UI screen.

2. The remote control apparatus according to claim 1, wherein the command is input by a user via the UI screen.

3. The remote control apparatus according to claim 1, wherein the UI screen comprises key information indicating a location of keys.

4. The remote control apparatus according to claim 1, wherein the UI screen comprises key information indicating a type of keys.

5. The remote control apparatus according to claim 1, wherein the controller is further configured to update the UI screen in response to receiving new identification information from the external display apparatus.

6. A method for controlling an external display apparatus by a remote control apparatus, the method comprising:
  generating mapping information indicating relationships between applications that are executable in the display apparatus and a plurality of user interface (UI) screens of the applications stored in the remote control apparatus;
  receiving identification information of an application which is being executed in the external display apparatus from the external display apparatus;
  selecting a UI screen from among the plurality of UI screens stored in the remote control apparatus based on the identification information and the mapping information; and
  displaying the UI screen such that the application executed in the external display apparatus is controlled by a command received via the UI screen.

7. The method as claimed in claim 6, further comprising storing the plurality of UI screens in a storage of the remote control apparatus.

8. The method according to claim 6, wherein the command is input by a user via the UI screen.

9. The method according to claim 6, wherein the UI screen comprises key information indicating a location of keys.

10. The method according to claim 6, wherein the UI screen comprises key information indicating a type of keys.

11. The method according to claim 6, further comprising updating the UI screen in response to receiving new identification information from the external display apparatus.

* * * * *